United States Patent [19]

Yauger et al.

[11] Patent Number: 4,802,786
[45] Date of Patent: Feb. 7, 1989

[54] JOIST HANGER

[75] Inventors: James G. Yauger, Liuonia; John M. Rushton, Milford, both of Mich.

[73] Assignee: MiTek Industries, Inc., Creve Coeur, Mo.

[21] Appl. No.: 116,445

[22] Filed: Nov. 3, 1987

[51] Int. Cl.⁴ .............................................. B65G 3/28
[52] U.S. Cl. .................... 403/232.1; 52/702; 248/188; 403/283
[58] Field of Search ............... 403/232.1, 283; 52/702; 182/224; 108/156; 248/188

[56] References Cited

U.S. PATENT DOCUMENTS

| | | | |
|---|---|---|---|
| 2,359,117 | 9/1944 | Johnson | 403/283 |
| 2,500,636 | 3/1950 | Isakson | 52/702 X |
| 3,538,906 | 11/1970 | Heraty et al. | 248/188 |
| 4,102,586 | 7/1978 | Pearson | 403/283 X |
| 4,414,785 | 11/1983 | Howell | 403/232.1 |

Primary Examiner—James T. McCall
Attorney, Agent, or Firm—Senniger, Powers, Leavitt and Roedel

[57] ABSTRACT

A joist hanger of the type comprising an upright back, parallel opposing sides forming a channel and a horizontal bottom extending forwardly from the back forming a seat for a joist, the hanger having at least one pair of opposing tabs extending inwardly from the sides of the hanger into the channel, the tabs presenting downwardly, rearwardly sloping surfaces to a joist forced against the tabs to urge the joist against the back of the hanger. The innermost edges of the tabs being knife-like for penetrating a joist forced against the tabs. The tabs are preferably formed by a portion of the side folded inwardly along a downwardly, rearwardly sloping fold line.

20 Claims, 3 Drawing Sheets

JOIST HANGER

BACKGROUND AND SUMMARY OF THE INVENTION

This invention relates to joist hangers, and in particular to improvements in hangers for wooden joists to properly seat and secure the joist in the hanger.

Metal hangers are widely used in wood frame construction to attach joists to carrying members. These hangers typically comprise an upright back, parallel opposing sides forming a channel for receiving the joist, and a horizontal bottom extending forwardly from the back forming a seat for the joist. Some of these hangers also have a flange extending rearwardly from the hanger for engaging the carrying member. Some of these hangers may also have holes provided to secure the hanger to the joist with screws or nails.

However, to save time and lower cost of installation it is preferable to avoid separately nailing or screwing each hanger to a joist, and thus hangers have been constructed to self-secure a joist inserted into the hanger. For example, the sides of some hangers are constructed to frictionally grip a joist inserted into the hanger. Another example is the hanger in Gilb, U.S. Pat. No. 3,663,950, which has a retainer member formed as part of the sides of the hanger and blunt-faced cutting teeth for cutting a groove in the joist for the retainer member. A problem with these prior self-secure type hangers, however, has been their inability to readily accommodate typical dimensional variances among joists of the same nominal size which arise from dressing tolerances and wood swelling and shrinkage. These prior self-secure hangers are difficult to put on slightly oversized joists and difficult to keep on slightly undersized joists.

Because a large number of hangers may be needed in a structure, it is important to minimize the cost of the hangers. However, the types of hangers presently in use generally must be carefully sized and formed to properly engage the joist, and thus the hangers can be expensive. It is also important that the hangers secure the joist and prevent the joist from working free from the hanger. However, in hangers employing a frictional grip the joist can work free, especially during the rough handling they are likely to receive on a construction site. The joist must be properly seated for the hanger to properly secure the joist. However, it is sometimes difficult to properly insert the joist into the hanger, and if the end of the joist is not carefully aligned with the back of the hanger as the joist is inserted into the hanger, the joist will not be properly seated. Thus proper engagement between the hangers and the joists requires careful installation which is expensive and time consuming.

It is therefore among the objects of the present invention to provide a self-secure type joist hanger that can accommodate typically encountered variances among joists of the same nominal size; to provide such a hanger that is of simple and inexpensive construction and which does not require precise forming; to provide such a hanger that secures the joist and prevents the joist from working out of the hanger, even during rough handling; and to provide such a hanger that helps to properly seat the joist in the hanger, without careful alignment or special effort by the installers.

Generally, the joist hanger of the present invention comprises an upright back, parallel opposing sides forming a channel and a horizontal bottom extending forwardly from the back forming a seat for the joist. At least one pair of opposing tabs extends inwardly from the sides of the hanger into the channel to present downwardly, rearwardly sloping surfaces to a joint forced against the tabs, to urge the joist against the back of the hanger. The innermost edge of each tab is knife-like, for penetrating the joist forced against the tab. The tabs are preferably formed from portions of the sides folded inwardly along downwardly, rearwardly sloping fold lines. Each fold line preferably extends from the base of a slit in the side to a point on the front edge of the side above the base of the slit. The slit preferably extends reardwardly, parallel to the horizontal bottom. The tabs are therefore triangular, having an apex extending into the channel and acting like a barb to engage the joist and prevent its escape from the hanger.

Other objects and features will be in part apparent and in part pointed out hereinafter.

BRIEF DESCRIPTION OF THE DRAWINGS

Corresponding reference characters indicate correspoding parts throughout the several views of the drawings.

DETAILED DESCRIPTION OF THE PREFERRED EMBODIMENTS

Figure 1:
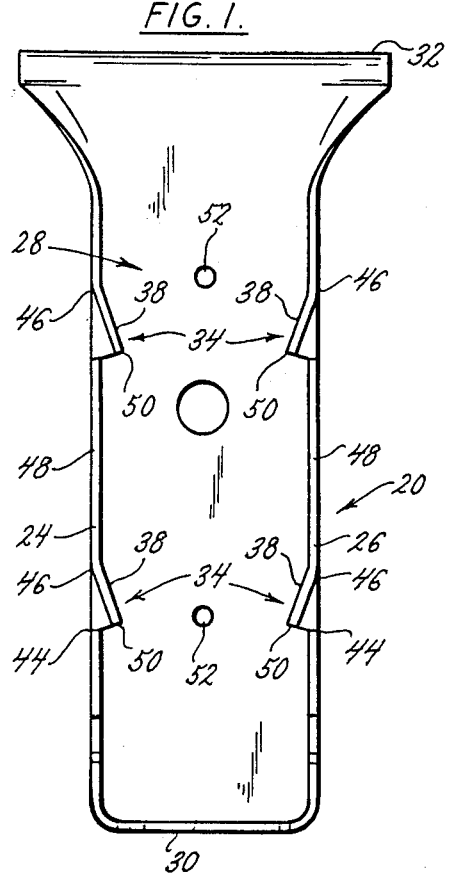
FIG. 1 is a front elevation view of a first embodiment of a joist hanger constructed according to the principles of the present invention.
Figure 2:
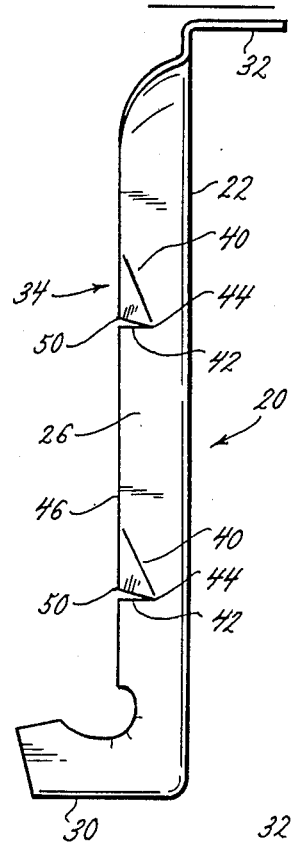
FIG. 2 is a right side elevation view of the joist hanger.
Figure 3:
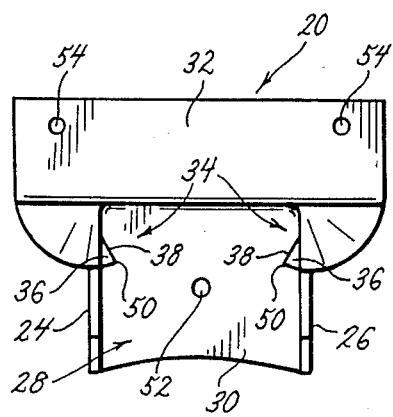
FIG. 3 is a top plan view of the joist hanger.
Figure 4:
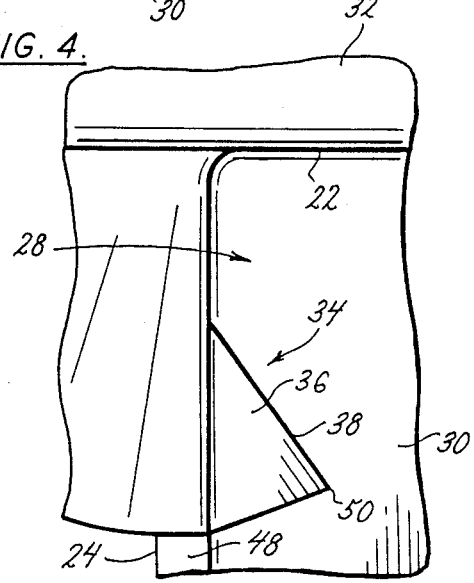
FIG. 4 is an enlarged partial top plan view of the joist hanger, showing one of the tabs for engaging the joist.

A first embodiment of a joist hanger constructed according to the principles of this invention is indicated generally as 20 in FIGS. 1–3. The hanger 20 comprises an upright back 22, forwardly extending, parallel, opposing sides 24 and 26 forming a channel 28 for receiving the end of a joist, and a horizontal bottom 30 extending forwardly from the back 22 and forming a seat for the joist. In the first embodiment illustrated in FIGS. 1–4, horizontal top flange 32 extends rearwardly from the back and is adapted for engagement with a structural of carrying member. Hanger 20 is preferably made from galvanized steel, and can be inexpensively made by stamping and punching.

At least one pair of opposing tabs 34 extends inwardly from the sides of the hanger into the channel to present downwardly rearwardly sloping surfaces 36 to a joist forced against the tabs, to urge the joist against the back of the hanger. The tabs are preferably triangular in shape, with one apex of the triangle extending into the channel. The innermost edges 38 of the tabs are relatively sharp, knife-like edges for penetrating the joist forced against the tab.

The tabs are preferably formed from portions of the respective sides 24 and 26 folded inwardly along downwardly, rearwardly sloping fold lines 40. To minimize manufacturing costs the tabs can be formed by making slits 42 in the sides and folding the portions of the sides above the slits into the channel along the fold line extending from bases 44 of slits 42 to points 46 on the front edges 48 of the sides above the bases 44 of the slits. The sharp innermost edge 38 of each tab is thus formed by the inner edge of the respective side, between the front edge 48 of the side and the inner surface of the side. The slits 42 forming the tabs 34 preferably extend rearwardly generally parallel to the bottom 30 so that the apex 50 of the triangular tab extending into the channel has an approximately 90° angle, forming a barb that engages a joist inserted into the channel and resists its removal from the hanger. Alternatively, the slits 42 could slope generally upwardly so that the apex of the triangular tab extending into the channel has an acute angle, forming a relatively sharp barb to engage the joist and resist its removal. Nail holes 52 can be provided in the back 22 so that the joist can be further secured in the hanger with nails, if desired, although the use of such supplemental fasteners in holes 52 is normally not necessary. Nail holes 54 can be provided in flange 32 to secure the hanger to a structural of carrying member.

The joist is installed in the hanger by generally aligning the end of the joist against the back of the hanger, and driving the joist downwardly into the channel, or by driving the hanger upwardly over the end of the joist. As the joist moves downwardly in the channel, the sharp innermost edges 38 of the first pair of opposing tabs 34 engage and penetrate the joist; and, as the edges 38 penetrate the joist, the surfaces 36 engage the joist. As the joist is urged against the tabs 34, the surfaces 36, because of their generally rearwardly downwardly sloping orientation, urge the end of the joist rearwardly against the back of the hanger, firmly seating the joist even if the end of the joist was not aligned to be completely flush against the back of the hanger before the hanger was installed on the joist.

Because of the cutting or slicing action of the relatively sharp, knife-like edges 38 of the tabs 34, the tabs 34 can extend far into the channel 28 so that their apexes 50 are close together. This enables the tabs to effectively engage a slightly undersized joist while the sharp edges still permit a slightly oversized joist end to be readily inserted to the channel 28 without appreciable spreading of the sides of the hanger. The hanger of the present invention is thus better able to accommodate the dimensional tolerances typically encountered among joists of the same nominal size than the prior art hangers such as those employing blunt-faced cutting teeth for chiseling a groove in the joist end or those constructed to frictionally grip a joist end. The cutting or slicing action of the knife-like edges 38 enables the sides 24 and 26 of the hanger to be made wider to provide greater lateral support for the sides of the joist, and to position the tabs 34 further from the end for more secure gripping, the to prevent undersirable spreading of the sides of the hanger.

Once the joist is inserted in the channel, the apexes 50 of the tabs act like barbs, securing the joist and resisting its removal from the hanger.

Figure 5:
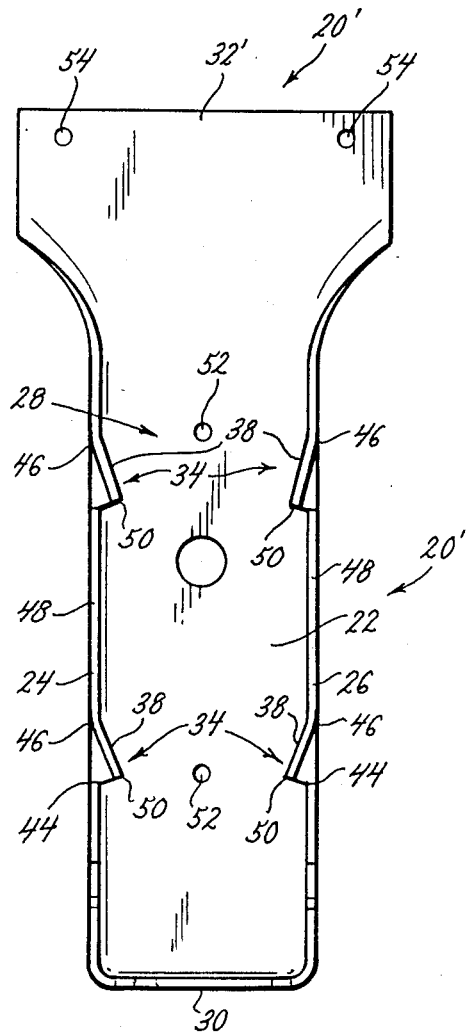
FIG. 5 is a front elevation view of a second embodiment of a joist hanger constructed according to the principles of the present invention, similar to the hanger of the first embodiment but with a vertical top flange.

A second embodiment of a hanger constructed according to the principles of this invention is indicated as 20' in FIG. 5. The hanger 20' is identical in all but one respect to hanger 20, described above, and corresponding parts are indicated with corresponding reference numerals. The only difference between hanger 20' and hanger 20 is that the horizontal top flange 32 extending rearwardly from the back 22 in hanger 20 has been replaced with a vertical top flange 32' in hanger 20'. This is because in some instances, for example in rehabbing applications, the top of the structural or carrying member is covered or inaccessible, and thus the flange 32 could not be properly seated. In such a case hanger 20' could be used to hang joists.

Figure 6:
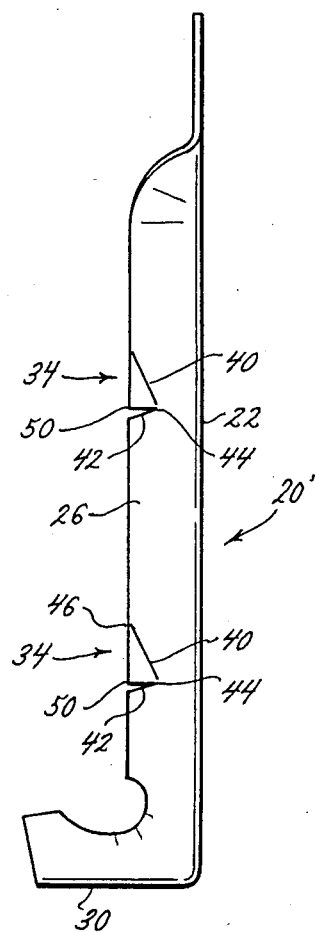
FIG. 6 is a right side elevation view of the second embodiment.
Figure 7:
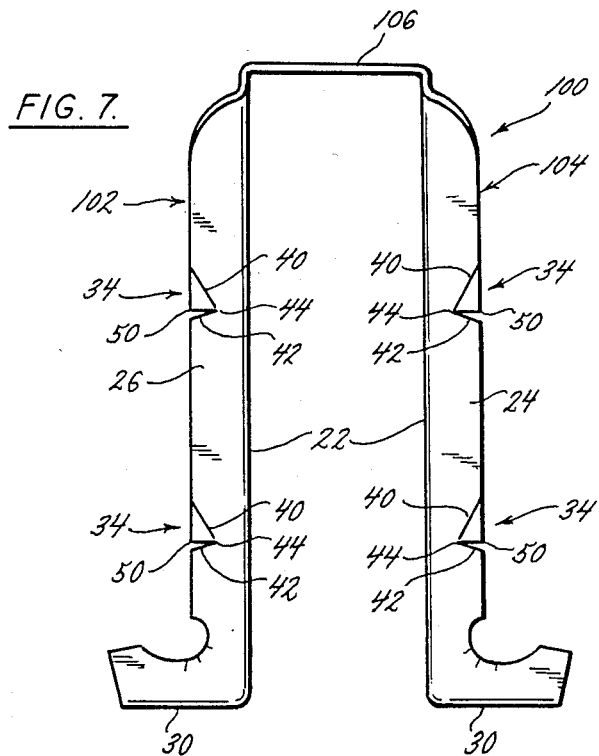
FIG. 7 is a side elevation view of a third embodiment of the joist hanger constructed according to the principles of the present invention, showing a saddle-type joist hanger.
Figure 8:
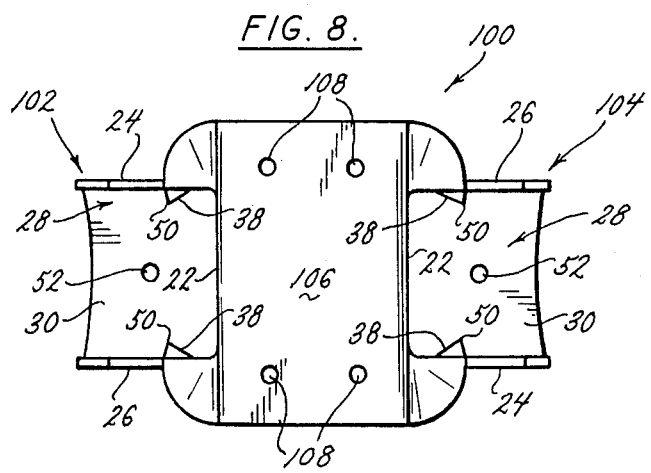
FIG. 8 is a top plan view of the saddle-type joist hanger.

A third embodiment of a hanger constructed according to the principles of this invention is indicated as 100 in FIGS. 6 and 7. Hanger 100 is a saddle type joist hanger comprising two oppositely facing hangers 102 and 104 joined at their top edges by a web 106. Each of the hangers 102 and 104 is substantially identical to hanger 20, described above, and corresponding parts are indicated with corresponding reference numerals. Hanger 100 is adapted to be mounted over a structural or carrying member with the web 106 engaging the top of the structural or carrying member and one of the hangers 102 and 104 facing outwardly on each side to engage a joist. The web 106 can provided with holes 108 for nails to secure the hanger 100.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An improved joist hanger of the type comprising an upright back, parallel opposing sides forming a channel and a horizontal bottom extending forwardly from the back forming a seat for a joist, the improvement comprising:
    at least one pair of opposing tabs extending inwardly from the sides of the hanger into the channel, the tabs presenting downwardly, rearwardly sloping surfaces to a joist forced against the tabs to urge the joist against the back of the hanger.

2. The improved joist hanger according to claim 1 wherein the innermost edge of each tab is knife-like for penetrating a joist forced against the tabs.

3. The improved joist hanger according to claim 1 wherein each tab is formed by a portion of the side folded inwardly along a downwardly, rearwardly sloping fold line.

4. The improved joist hanger according to claim 3 wherein the fold line extends from the base of a slit in the sidewall to a point on the front edge of the side above the base of the slit.

5. The improved joist hanger according to claim 4 wherein the slit extends substantially parallel to the bottom of the hanger.

6. The improved joist hanger according to claim 4 wherein the slit slopes generally upwardly and rearwardly in the side, defining a generally triangular tab having an acute angle at the apex of the tab which extends into the channel.

7. The improved joist hanger according to claim 1 wherein there are two pairs of opposing tabs, one pair spaced above the other.

8. The improved joist hanger according to claim 1 further comprising a horizontal top flange extending rearwardly from the back of the hanger and adapted for engagement with a carrying member.

9. An improved joist hanger of the type comprising an upright back, parallel opposing sides forming a channel for receiving a joist and a horizontal bottom extending forwardly from the back forming a seat for the joist, the improvement comprising:

at least one pair of opposing tabs extending inwardly from the sides of the hanger into the channel, each tab formed by a portion of the side folded inwardly along a downwardly, rearwardly sloping fold line and presenting an inwardly sloping knife-like edge for penetrating a joist forced against the tabs, the tabs forming downwardly, rearwardly sloping surfaces for urging a joist forced against the tabs against the back of the hanger.

10. The improved joist hanger according to claim 9 wherein the fold line extends from the base of a slit in the side to a point on the front edge of the sidewall above the base of the slit.

11. The improved joist hanger according to claim 10 wherein the slit extends substantially parallel to the bottom of the hanger.

12. The improved joist hanger according to claim 8 wherein the slit slopes generally upwardly and rearwardly in the side, defining a generally triangular tab having an acute angle at the apex of the tab which extends into the channel.

13. The improved joist hanger according to claim 9 wherein there are two pairs of opposing tabs, one pair spaced above the other.

14. A joist hanger of the type comprising an upright back, parallel opposing sides forming a channel for receiving a joist and a horizontal bottom extending forwardly from the back forming a seat for the joist, and a horizontal top flange extending rearwardly from the back and adapted for engagement with a carrying member, the hanger comprising slits in the side and at least one pair of opposing tabs extending inwardly from the sides of the hanger into the channel, the tabs being formed by the portions of the sides above the slit being folded inwardly along a downwardly rearwardly sloping fold line, the tabs presenting an inwardly sloping knife-like edges for penetrating a joist forced against the tabs, the tabs forming downwardly, rearwardly sloping surfaces for urging a joist forced against the tabs against the back of the hanger.

15. The joist hanger according to claim 14 wherein the slits in the sides are substatially parallel to the seat of the hanger.

16. An improved saddle-type joist hanger of the type comprising two oppositely-facing joist hangers, each comprising an upright back, parallel opposing sides forming a channel for receiving a joist and a horizontal bottom extending forwardly from the back forming a seat for the joist, and a web connecting the top edges of the hangers, the improvement comprising:

at least one pair of opposing tabs extending inwardly from the sides of each hanger into the channel, each tab formed by a portion of the side folded inwardly along a downwardly, rearwardly sloping fold line and presenting an inwardly sloping knife-like edge for penetrating a joist forced against the tabs, the tabs forming downwardly, rearwardly sloping surfaces for urging a joist forced against the tabs against the back of the hanger.

17. The improved joist hanger according to claim 16 wherein the fold line extends from the base of a slit in the side to a point on the front edge of the sidewall above the base of the slit.

18. The improved joist hanger according to claim 16 wherein the slit extends substantially parallel to the bottom of the hanger.

19. The improved joist hanger according to claim 17 wherein the slit slopes generally upwardly and rearwardly in the side, defining a generally triangular tab having an acute angle at the apex of the tab which extends into the channels.

20. The improved joist hanger according to claim 16 wherein there are two pairs of opposing tabs, one pair spaced above the other.

* * * * *